Feb. 4, 1969     P. COUSIN ET AL     3,425,812
METHOD AND APPARATUS FOR THE PHYSICAL SEPARATION OF THE
COMPONENTS OF A BINARY MIXTURE

Filed June 8, 1965     Sheet 1 of 2

INVENTORS
PHILIPPE COUSIN
RENÉ ROCHE

BY Bacon & Thomas

ATTORNEYS

United States Patent Office 3,425,812
Patented Feb. 4, 1969

3,425,812
METHOD AND APPARATUS FOR THE PHYSICAL SEPARATION OF THE COMPONENTS OF A BINARY MIXTURE
Philippe Cousin, Le Havre, and René Roche, Meudon-Bellevue, France, assignors to Commissariat a l'Energie Atomique, Paris, France
Filed June 8, 1965, Ser. No. 462,453
Claims priority, application France, June 18, 1964, 978,784
U.S. Cl. 23—326                2 Claims
Int. Cl. C01g *43/06*

ABSTRACT OF THE DISCLOSURE

The present invention relates to a method for carrying out the physical separation of the two components of a binary mixture when said components are capable of forming an azeotrope. This method is suitable in particular for treating mixtures of uranium hexafluoride and hydrofluoric acid. The method entails crystallizinng the major portion of $UF_6$ directly from the gaseous state under conditions such that the remaining gas mixture be a first azeotropic mixture of low $UF_6$ content, condensing the remaining mixture and distilling the condensed mixture to isolate HF from a second azeotropic mixture of $UF_6$ and HF under conditions such that the $UF_6$ content of said second azeotropic mixture is greater than that of said first azeotropic mixture.

---

The method according to the present invention is characterized in particular in that it comprises, starting from a gas-mixture, the steps of crystallizing the major portion of one of the components of said mixture, condensing the remaining gas-mixture, then distillating said mixture with a view to isolate the second component, the operating conditions of the crystallization and distillation steps being respectively such that a greater proportion of said second component is contained in the gas-mixture after the crystallization step than in the azeotropic mixture provided by the distillation step.

The method according to the present invention resorts to cendensing a gas directly into a solid and it is of special interest when at least one of the two components of the mixture can easily sublime.

In addition, said method has over a mere crystallization the advantage of permitting to isolate each of the components in a substantially pure state, and it is therefore attractive whenever costly products are involved.

For the above two reason, the method according to the invention is specially suitable for separating uranium hexafluoride and hydrofluoric acid, for instance in isotope separation installations. It then provides a simple and economically feasible means for recuperating hydrofluoric acid.

The features of the present invention will be disclosed hereafter, reference being had to the accompanying drawing relating by way of example to the treatment of gas mixtures of uranium hexafluoride and hydrofluoric acid, and in which.

Figure 4:
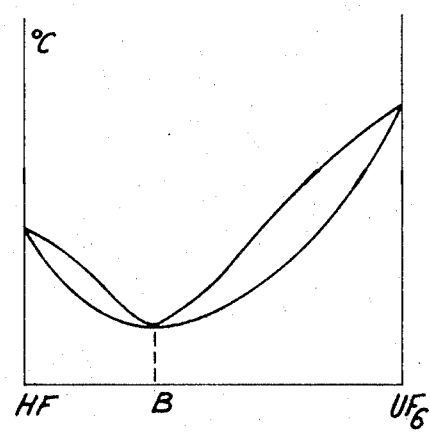

FIG. 4 the corresponding chart at upper pressures.

Figure 1:
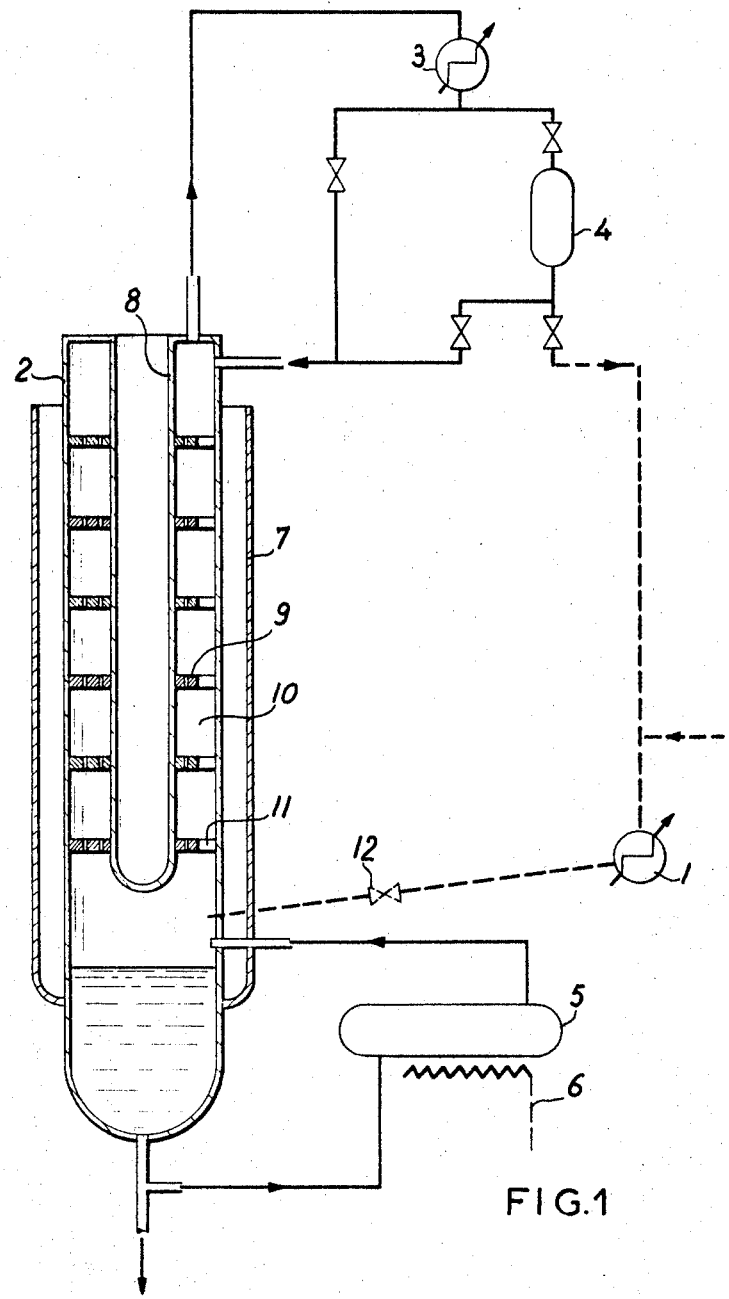
FIG. 1 shows a device for carrying out the method according to the invention. For the sake of clearness, the conduits connecting the two main apparatus (viz crystallizer and distillation column) have been represented in dotted line.
Figure 2:
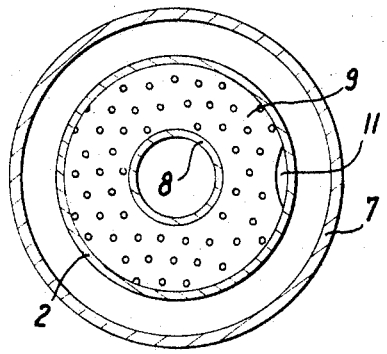
FIG. 2 is a cross-section of the distillation column, in which can be seen one of the perforated plates of said column.

The device shown in FIG. 1 essentially comprises a crystallizer 1 and a distillation column 2 provided with its fittings, viz in particular an overhead-vapour condenser 3, a reflux drum 4 and a reboiler 5. Condenser 3 is cooled with water and reboiler 5 is heated by means of a resistor 6. Crystallizer 1, in the example disclosed, is merely constituted by an enclosed space provided with a nest of tubes in which flows a cooling fluid. Column 2 is provided with an outer jacket 7 and an inner sleeve 8 inside which a cooling fluid, e.g. a liquefied gas, can be introduced. In addition, said column is fitted with perforated plates 9, such as the one shown in FIG. 2, the annular shape of which matches that of the column freespace 10 around sleeve 8. These plates are provided with down-take openings 11.

Figure 3:
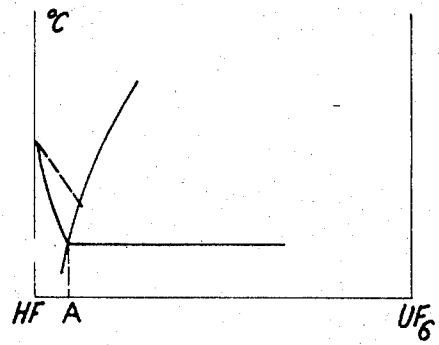
FIG. 3 is the phase-balance chart of $UF_6+HF$ mixtures at lower pressures.

In the first stage of the method according to the invention, the gas mixture of $UF_6$ and HF is introduced into crystallizer 1. The temperature and pressure conditions are so chosen that $UF_6$ will crystallize. The balance diagram of the binary mixture is of the type shown in FIG. 3 in which an azeotropic mixture is displayed and, in addition, the operating conditions are so chosen that the azeotropic mixture will contain the smallest possible proportion of $UF_6$ compatible with technical requirements and reasons of economy.

The crystallization step will thus provide substantially pure, solid uranium hexafluoride, on the one hand, and an azeotropic mixture A, on the other hand. It can be noted, by way of example, that, if crystallization occurs at a temperature of $-40°$ C. and substantially under normal air pressure, the remaining azeotrope in the vapour phase will contain about 1.4% moles of uranium hexafluoride.

The azeotropic gas mixture is collected in column 2 which then serves as a condensation trap. To this end, column 2 is cooled internally and externally, for instance down to $-140°$ C. by means of liquid nitrogen. The azeotropic mixture introduced through the lower portion of the column forms a solid deposit on the walls and on the successive plates, and the gas mixture is allowed to rise up to the upper plates through the so-called down-take openings 11.

Crystallizer 1 is then disconnected from column 2 by the closing of valve 12, and it is subsequently raised to a temperature which is sufficient for causing uranium hexafluoride to sublime or to be liquefied. Preferably, this operating step in carried out at a pressure slightly above that of the triple point, and uranium hexafluoride is drawn off in the liquid state.

In column 2 where azeotropic mixture A is retained the distillation step can be started. To this end, the liquefied nitrogen present in jacket 7 and in sleeve 8 is expelled by dry air and the distillation step is put in operation and adjusted. This operating step is carried out at a high pressure e.g. of about 10 atmospheres (145 p.s.i.) so that, since the boiling diagrams of binary mixtures $UF_6+HF$ is then of the type shown in FIG. 4, it is possible, through the distillation step, to separate from mixture A substantially pure hydrofluoric acid and an azeotrope B containing more $UF_6$ than mixture A.

Since the boiling point of the azeotrope is a minimum of the diagram, said azeotrope is obtained in the vapour-phase at the column-head, and once it has been condensed in condenser 3, it is drawn off from reflux-drum 4 in the liquid state. It is then recycled into crystallizer 1 and is re-treated with the following batch. Hydrofluoric acid is drawn off from the bottom of the column in the liquid state. It can be noted, by way of example, that if distillation is carried out at a pressure of about 11 kg./cm.$^2$ abs. (150 p.s.i.g), the azeotrope, the boiling point of which is in the neighbourhood of 110° C. (230° F.) will contain about 19% moles of $UF_6$.

In the example such as above described, the method according to the invention is carried out, discontinuously. It is however quite obvious that other devices would permit a continuous operation. To this end, one could for instance provide instead of a single crystallyzer 1, two similar crystallizers mounted in parallel, and alternatively in the crystallization phase and in the phase during which $UF_6$ is liquefied and drawn off.

At the same time, in order that column 2 can continuously operate as a distilling-column, one could insert conventional condensation traps in the circuit of azeotropic mixture A, between crystallizer 1 and column 2. A suitable regulating device would dispense with a permanent supervision.

It is of course possible to make changes of detail in the above described method without going beyond the scope of the present invention.

In particular, the method according to the invention can be applied to mixtures other than mixtures of uranium hexafluoride and hydrofluoric acid.

What is claimed is:

1. A method for carrying out the physical separation of uranium hexafluoride from hydrofluoric acid in a binary mixture of these two bodies, said method comprising the steps of crystallizing the major portion of uranium hexafluoride of said binary mixture directly from the gaseous state under conditions of temperature and pressure such that the remaining gas mixture be a first azeotropic mixture of low uranium hexafluoride content, condensing said remaining gas mixture, and distillating said thus condensed remaining gas mixture so as to isolate hydrofluoric acid from a second azeotropic mixture of uranium hexafluoride and hydrofluoric acid under conditions of temperature and high pressure such that the uranium hexafluoride content of said second azeotropic mixture be greater than that of said first azeotropic mixture.

2. A method for carrying out the physical separation of uranium hexafluoride from hydrofluoric acid in a binary mixture of these two bodies, said method comprising the steps of crystallizing the major portion of uranium hexafluoride of said binary mixture directly from the gaseous state under conditions of temperature and pressure such that the remaining gas mixture be a first azeotropic mixture of low uranium hexafluoride content, condensing said remaining gas mixture, distillating said thus condensed remaining gas mixture so as to isolate hydrofluoric acid from a second azeotropic mixture of uranium hexafluoride and hydrofluoric acid under conditions of temperature and high pressure such that the uranium hexafluoride content of said first azeotropic mixture be greater than that of said first azeotropic mixture, and re-cycling said second azeotropic mixture to said crystallisation step.

References Cited

UNITED STATES PATENTS 3,160,490  12/1964  Fabre et al _____ 23—352 X

CARL. D. QUARFORTH, *Primary Examiner.*

M. J. McGREAL, *Assistant Examiner.*

U.S. Cl. X.R.

23—352